(12) United States Patent
Szapiel

(10) Patent No.: US 8,988,773 B2
(45) Date of Patent: Mar. 24, 2015

(54) OPTICAL SIGHTING DEVICE

(71) Applicant: Raytheon Canada Limited, Ottawa (CA)

(72) Inventor: Stanislaw Szapiel, Port Mcnicoll (CA)

(73) Assignee: Raytheon Canada Limited, Ottawa (CA)

( * ) Notice: Subject to any disclaimer, the term of this patent is extended or adjusted under 35 U.S.C. 154(b) by 273 days.

(21) Appl. No.: 13/631,040

(22) Filed: Sep. 28, 2012

(65) Prior Publication Data

US 2014/0092470 A1 Apr. 3, 2014

(51) Int. Cl.
*G02B 23/00* (2006.01)
*G02B 15/10* (2006.01)

(52) U.S. Cl.
CPC .............. *G02B 23/145* (2013.01); *G02B 15/10* (2013.01)
USPC ............................ 359/420; 359/422; 359/672

(58) Field of Classification Search
USPC ................................... 359/419, 420, 422, 672
See application file for complete search history.

(56) References Cited

U.S. PATENT DOCUMENTS

| | | | | |
|---|---|---|---|---|
| 1,236,722 A | * | 8/1917 | Lange | 359/421 |
| 3,572,886 A | * | 3/1971 | Curtiss et al. | 359/420 |
| 3,762,795 A | * | 10/1973 | Bezu | 359/555 |
| 3,813,172 A | | 5/1974 | Walker et al. | |
| 4,260,217 A | * | 4/1981 | Traeger et al. | 359/353 |
| 4,469,396 A | | 9/1984 | Neil | |
| 5,691,842 A | * | 11/1997 | Devenyi et al. | 359/432 |
| 7,289,272 B2 | * | 10/2007 | Bowron et al. | 359/668 |
| 7,944,611 B1 | | 5/2011 | Regan et al. | |
| 8,675,285 B2 | * | 3/2014 | Obrebski | 359/672 |
| 2012/0057223 A1 | | 3/2012 | Cook | |

FOREIGN PATENT DOCUMENTS

| | | |
|---|---|---|
| WO | 2005040866 A2 | 5/2005 |
| WO | 2006113705 A2 | 10/2006 |

* cited by examiner

*Primary Examiner* — Frank Font
(74) *Attorney, Agent, or Firm* — Lando & Anastasi, LLP

(57) ABSTRACT

An optical sighting device and a method of providing magnification in the optical sighting device are disclosed. In one example, the optical sighting device comprises a first telescope including a first focal plane, a second telescope, comprising a first variable power lens group, a second variable power lens group, and a second focal plane positioned between the first and second variable power lens groups, and a rotary optical tumbler comprised of a Galilean telescope configured to rotate into and out of a optical path that extends through the first telescope, the Galilean telescope and the second telescope, the rotation being about an axis disposed relative to the optical path.

20 Claims, 5 Drawing Sheets

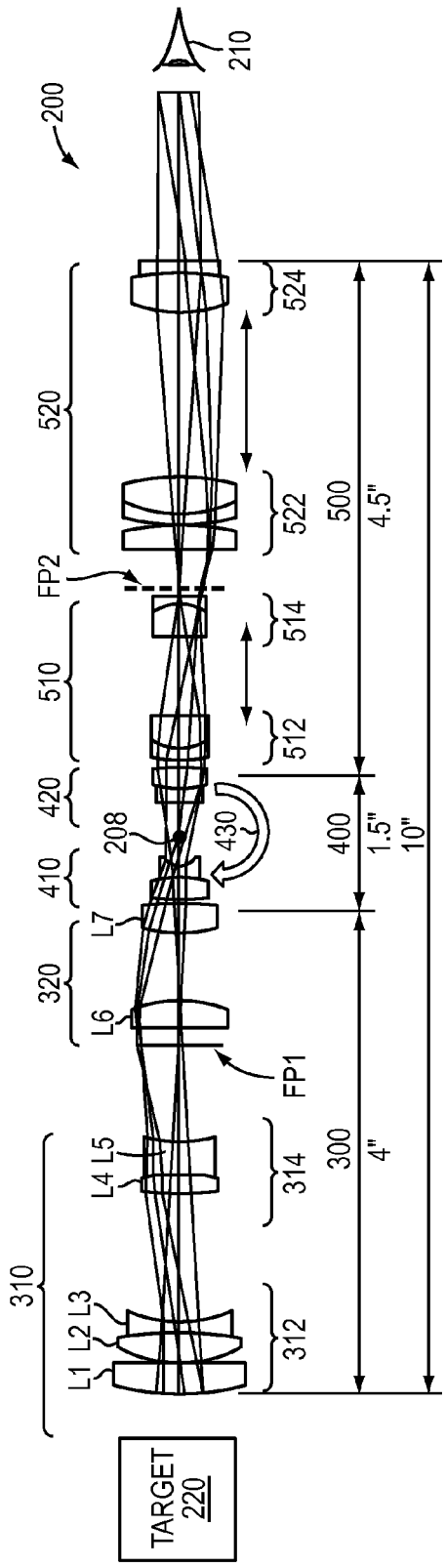
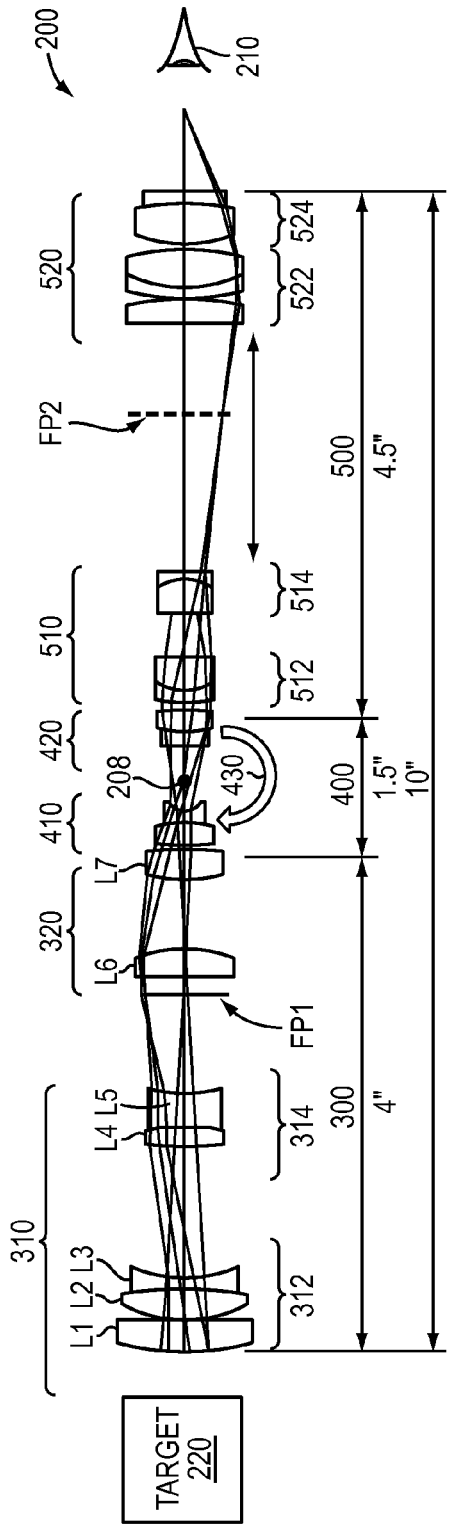

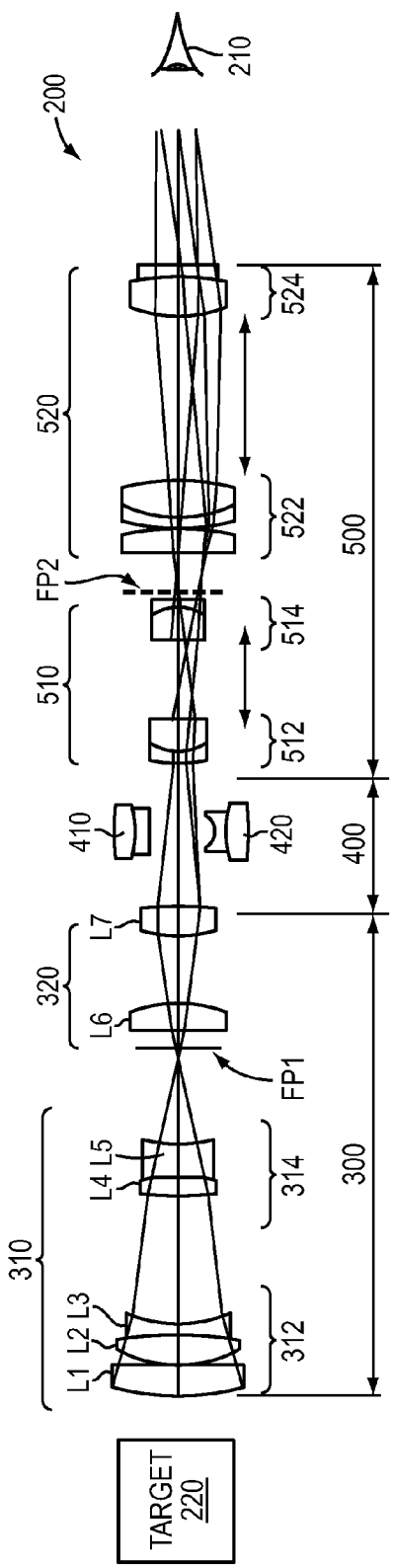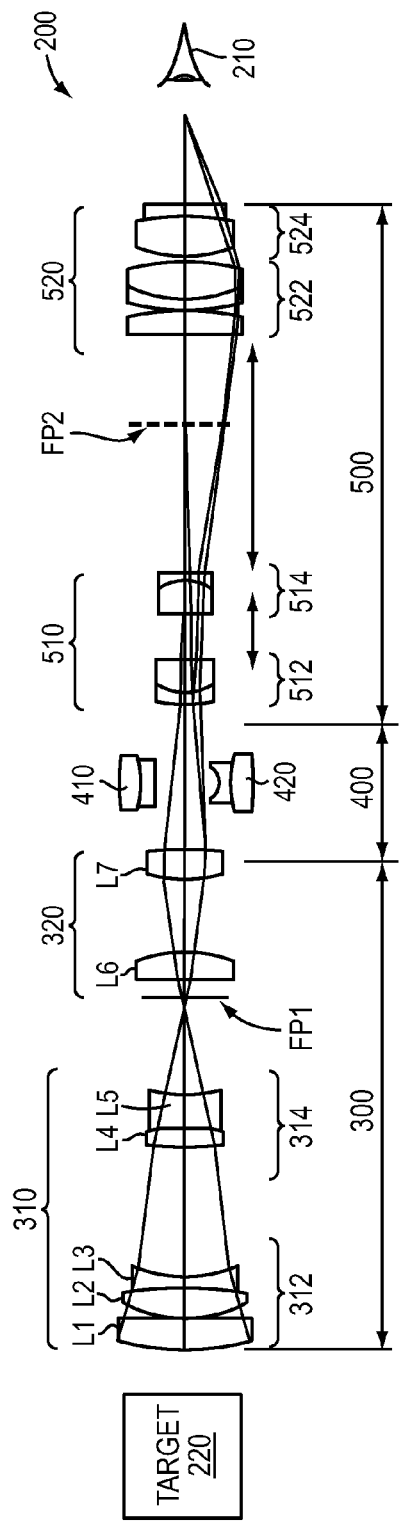

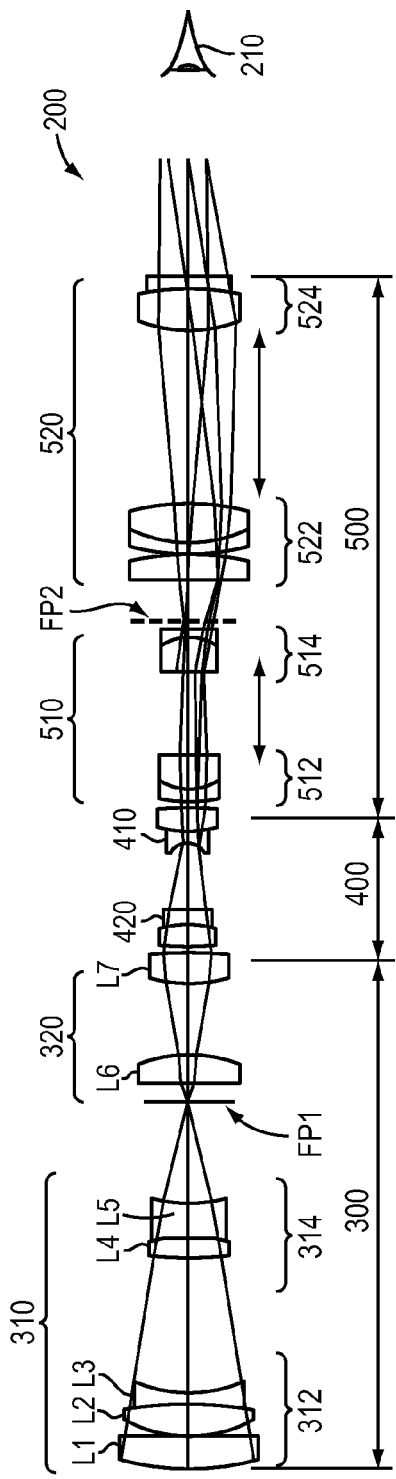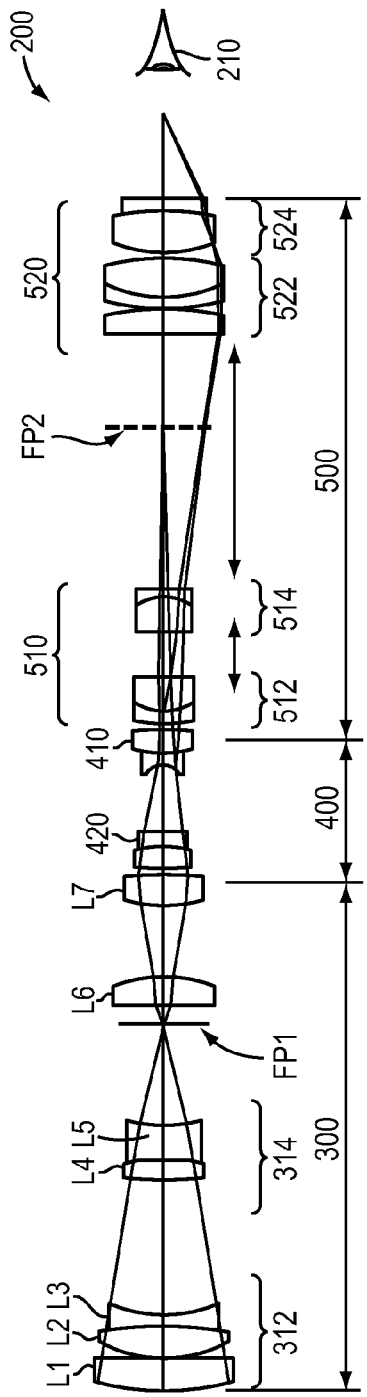

ized by a group of lenses arranged in a housing

OPTICAL SIGHTING DEVICE

BACKGROUND

Weapons such as rifles or pistols may include an optical (or telescopic) sighting device having optical components that magnify an image of a target. The optical sighting device typically includes a group of lenses disposed in a housing which is attached to the rifle. The lenses may be fixed in position relative to each other to provide fixed magnification, or may be movable to achieve variable or a range of magnification. Variable magnification of an image may allow the telescoping sighting device to be used in a wider range of applications. For example, a lower magnification may allow a user to scan the terrain for a particular object, while a higher magnification may allow the user to view the object in more detail. For uses in military, police and hunting applications, compact and lightweight optical sighting devices having a high magnification ratio (or zoom ratio) are desired. Magnification ratio or zoom ratio refers to the ratio of the highest and the lowest magnification provided by the optical sighting device.

FIG. 1 illustrates one example of an optical sighting device 10 having a variable magnification ratio, as described in U.S. Pat. No. 7,944,611 titled "HIGH ZOOM RATIO OPTICAL SIGHTING DEVICE" and issued on May 17, 2011. The optical sighting device 10 includes an erector system including a first lens erector 40 and a second lens erector 60, an objective lens 15, a prism erector assembly 25, an eyepiece 80 and three focal plains 30, 55 and 75. The lenses included in both the first and second lens erectors, 40 and 60 are moveable along an optical axis 12 to provide variable magnification. Since the erector assemblies each invert the image, the prism erector assembly 25 is needed to correct the inverted image and to produce an image in the same orientation as the object being imaged. The optical sighting device 10 may provide a magnification ration of approximately 10:1 with the total length of the optical sighting device 10 being approximately 14 inches. To achieve a higher magnification ratio (for example, approximately 27:1), the prism erector assembly 25 may be removed, and a third movable lens erector assembly may be added behind the focal plane 75. However, the addition of the third lens erector adds a fourth focal plane to the system and results in increased length of the overall optical sighting device by approximately 1-4 inches. Furthermore, the additional lens components increase the overall complexity and weight of the optical sighting device.

SUMMARY

Aspects and embodiments are directed to a compact and lightweight optical sighting device with a high magnification ratio. In one embodiment, the optical sighting device includes a rotary optical tumbler comprising of a Galilean telescope, disposed between a front telescope and a rear telescope in an optical path. For example, the optical sighting device described below may provide a magnification ratio of approximately 30:1 while having a total length of the device approximately 10 inches or less. In addition, the optical sighting device, as described further below, may include fewer components than the prior art optical sighting devices, which may result in a more durable device for military, police and hunting applications.

In one embodiment, an optical sighting device comprises a first telescope including a first focal plane, a second telescope, comprising a first variable power lens group, a second variable power lens group, and a second focal plane positioned between the first and second variable power lens groups, and a rotary optical tumbler comprised of a Galilean telescope configured to rotate into and out of a optical path that extends through the first telescope, the Galilean telescope and the second telescope, the rotation being about an axis disposed relative to the optical path.

In one example, the Galilean telescope is disposed between the first telescope and the second telescope. In another example, both of the first telescope and the second telescope are Keplerian telescopes. In at least one example, the first telescope includes a first positive objective group and a second positive objective group, both positioned on an object space side of the first focal plane. In addition, the first telescope further may include a first eyepiece lens singlet, and a second eyepiece lens singlet, both positioned along the optical path on an eyepiece space side of the first focal plane. Further, the Galilean telescope may be disposed between the first eyepiece lens singlet and the second eyepiece lens singlet.

In another example, the Galilean telescope further includes a positive objective lens group, and a negative eyepiece lens group positioned opposing the positive objective lens group. In one example, the first variable power lens group comprises an objective lens group positioned on an object space side of the second focal plane. In addition, the second variable power lens group may comprise an eyepiece lens group positioned along the optical path on an eyepiece space side of the second focal plane. Further, the objective lens group may include a stationary objective lens group and a movable objective lens group and the eyepiece lens group includes a stationary eyepiece lens group and a movable eyepiece lens group.

In one example, the rotary optical tumbler is configured to rotate about the axis into and out of three positions, and configured to provide a different magnification in each position. A first position may includes the negative eyepiece lens group of the rotary optical tumbler positioned proximate to the first telescope, and wherein the second telescope, in the first position, is configured to provide continuous magnification in a first magnification range. In at least one example, the first magnification range includes approximately 1× magnification to approximately 3.33× magnification.

A second position may include the positive objective lens group and the negative eyepiece lens group rotated perpendicular to the optical path, and wherein the second telescope, in the second magnification position, is configured to provide continuous magnification in a second magnification range. In at least one example, the second magnification range includes approximately 3.33× magnification to approximately 10× magnification.

A third position may include the positive objective lens group of the rotary optical tumbler positioned proximate to the first telescope, and wherein the optical sighting device, in the third magnification position, is configured to provide continuous magnification in a third magnification range. In at least one example, the third magnification range includes approximately 10× magnification to approximately 30× magnification. In one example, the optical sighting device is configured to provide continuous magnification in a range of approximately 1× magnification to approximately 30× magnification.

According to another embodiment, a method of providing magnification in an optical sighting device is disclosed. In one example, the optical sighting device includes a first telescope including a first focal plane, a second telescope comprising a first variable power lens group, a second variable power lens group, and a second focal plane positioned between the first and second variable power lens groups, and a rotary optical tumbler, comprised of a Galilean telescope, disposed between the first telescope and the second telescope, configured to rotate into and out of a optical path that extends through the first telescope, the Galilean telescope and the second telescope, the rotation being about an axis disposed in relation to the optical path. In this example, the method comprises rotating the rotary tumbler into and out of the optical path, around an axis disposed relative to the optical path, and switching between a plurality of positions including a first position configured to provide a first magnification range, a second position configured to provide a second magnification range and a third position configured to provide a third magnification range.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2A is a diagram of one example of an optical sighting device including a rotary tumbler in a first position, according to aspects of the present invention;

FIG. 2B is a diagram of one example of an optical sighting device including a rotary tumbler in a first position, according to aspects of the present invention;

FIG. 3A is a diagram of one example of an optical sighting device including a rotary tumbler in a second position, according to aspects of the present invention;

FIG. 3B is a diagram of one example of an optical sighting device including a rotary tumbler in a second position, according to aspects of the present invention;

FIG. 4A is a diagram of one example of an optical sighting device including a rotary tumbler in a third position, according to aspects of the present invention; and FIG. 4B is a diagram of one example of an optical sighting device including a rotary tumbler in a third position, according to aspects of the present invention.

DETAILED DESCRIPTION

Figure 1:
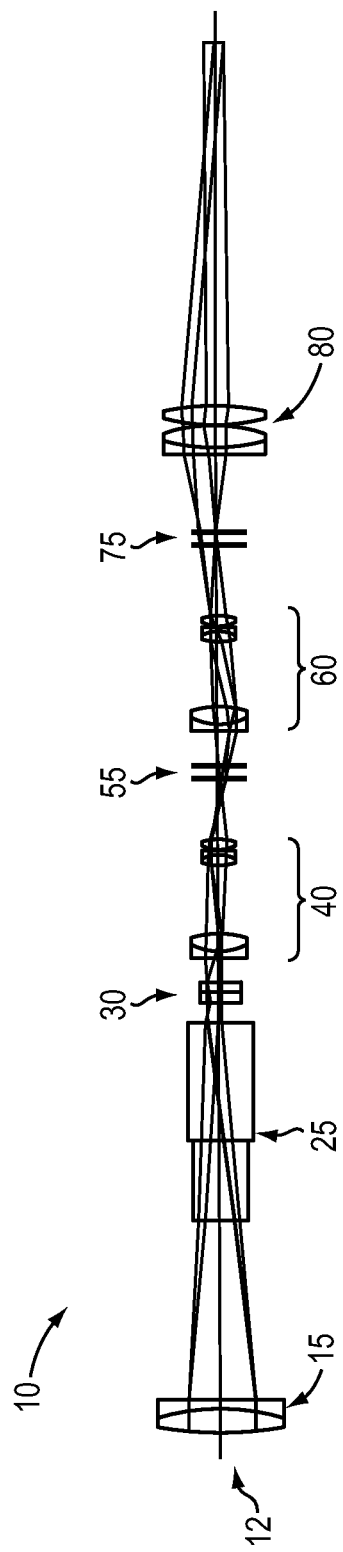
FIG. 1 is a diagram of one example of a conventional optical sighting device.

Aspects and embodiments are directed to an optical sighting device that is lightweight, compact and provides a high magnification ratio. According to one embodiment, such an optical sighting device is achieved using a combination of a first (or front) Keplerian telescope having the reticle in its focal plane, a second (or rear) Keplerian telescope having a continuously movable zoom lens group in its objective and/or eyepiece sections, and a switchable Galilean magnifier positioned between the two telescopes and configured to provide at least two or three different magnifications. As discussed in more detail below, the optical sighting device is able to provide a high magnification ratio, for example, on the order of about 30:1, for example, within a short, compact, and lightweight package, and without the need for an additional prismatic erector or third zoom erector as is required by some prior high magnification sights.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Referring to FIGS. 2A and 2B, there is illustrated an example of an optical sighting device 200 according to one embodiment. The optical sighting device 200 may be used in numerous applications, including, for example, as any type of a riflescope, a binocular, a spotting scope, or any other type of optical sighting device. As shown in FIGS. 2A and 2B (described in order disposed along an optical path from target 220 to eye 210), the optical sighting device 200 includes a front (or first) telescope 300 including a first focal plane FP1, a rotary optical tumbler 400, and a rear telescope 500 including a second focal plane FP2 disposed along an optical axis. Light rays from the target 220 travel along the optical path, first impinging on the front telescope 300 which transmits the light rays toward the rotary optical tumbler 400, and then being transmitted from the rotary optical tumbler toward the rear telescope 500. As discussed above, in one embodiment, the front and rear telescopes 300, 500 are Keplerian telescopes. The front telescope 300 provides a "base" level of magnification. The rear telescope 500 includes at least one zooming (or variable magnification) lens group, and the rotary optical tumbler 400 is switchable between different positions in which it provides different levels of magnification, such that together these components provide a range of magnification for the optical sighting device 200.

The front and rear telescopes 300, 500 and the optical tumbler 400 included in the optical sighting device 200 may be disposed in a housing (not shown) which may be mounted to a firearm, for example a rifle. The housing may further include additional mechanical components, for example, gear, cams, servos or other devices, and any necessary power supply for such devices, configured to move the optical components of the rear telescope 500 and/or rotary optical tumbler 400 to provide the varying levels of magnification for the optical sighting device 200.

According to one embodiment, the front telescope 300 includes a positive objective group 310, a reticle located at the first focal plane FP1, and an eyepiece 320. In one example, the reticle is a set of fine lines engraved in the eyepiece, which may be used to assist aiming of the rifle or other weapon. In the example illustrated in FIGS. 2A and 2B, the positive objective group 310 of the front telescope 300 includes five lenses arranged into a first positive objective lens group 312 (L1, L2 and L3) and a second positive objective lens group 314 (L4 and L5), both of which are disposed on the object space (or target) side of the first focal plane FP1. The shape and/or positioning of the lenses L1-L5 may be selected such that the positive objective group 310, together with the positive eyepiece group 320, provides a predetermined base level of magnification for the optical sighting device 200. This base level of magnification, mf, may be greater than or equal to unity. In the example illustrated in FIGS. 2A and 2B, the eyepiece 320 of the front telescope 300 includes a first eyepiece lens L6, and a second eyepiece lens L7. Both the first and the second eyepiece lenses L6 and L7 may be single lenses (or singlets).

According to various embodiments, the combination of the objective lenses in the first and second positive objective lens groups 312 and 314 gather light from the target 220 and focus the light onto the first focal plane FP1. The eyepiece lenses L6 and L7 receive light from the objective lens groups and transmit the approximately collimated light toward the rotary optical tumbler 400. As noted above, in one example, the first positive objective lens group 312 includes three objective lenses L1, L2 and L3. The objective lens L1 may be a plano-convex lens and the two of the objective lenses L2 and L3 may be cemented lenses including a biconvex L2 and a biconcave lens L3. The second positive objective lens group 314 may include two objective lenses, L4 and L5, which also may be cemented lenses, including a biconvex L4 and a biconcave lens L5. The first eyepiece lens singlet L6 and the second eyepiece lens singlet L7 each may include a single lens element having a convex surface, with L6 being a plano-convex lens and L7 being a biconvex lens.

Still referring to FIGS. 2A and 2B, in one embodiment, the rotary optical tumbler 400 is a Galilean telescope, which includes a positive lens group 420 and a negative lens group 410. A Galilean telescope has an advantage in that it produces a virtual image, rather than a real image, and does not invert the image (unlike erector lens groups), as discussed further below. In one example, the positive lens group 420 includes a convergent objective lens (a cemented doublet) and the negative lens group 410 includes a divergent eyepiece lens (a cemented doublet).

According to various examples, the rotary tumbler 400 rotates about an axis relative to the optical path. In the example shown in FIGS. 2A and 2B, the rotary tumbler 400 rotates 180 degrees about an axis 208 perpendicular to the optical path (shown as a point in FIGS. 2A and 2B). The direction of rotation is illustrated in FIG. 2A-2B by the semicircular arrow 430. In other examples, the rotary tumbler 400 rotates about an axis parallel to the optical path. In other examples, the axis of rotation of the rotary tumbler 400 may be vertical in relation to the optical path. In further examples, the axis of rotation can be anywhere between a horizontal axis, such as the axis 208, and a vertical axis.

In the example illustrated in FIGS. 2A and 2B the negative lens group 410 is in a position proximate to the front telescope and the positive lens group 420 is in a position proximate to the rear telescope. As shown in FIGS. 2A and 2B, light rays from the front telescope 300 are received by the negative lens group 410 and transmitted to the positive lens group 420. The light rays received by the positive lens group 420 are transmitted to the rear telescope 500. As discussed in more detail below, in one embodiment, the rotary tumbler 400 is rotatable (or switchable) between three positions, each position providing a particular magnification range. The first position (or 180 degree position) is shown in FIGS. 2A and 2B providing a first magnification range. The second position (or the 90 degree position) is shown in FIGS. 3A and 3B providing a second magnification range. The third position (or the zero degree position) is shown in FIGS. 4A and 4B providing a third magnification range.

As discussed above, the rear (or second) telescope 500 may include variable magnification lens groups in either or both of its objective and eyepiece sections. Referring again to FIGS. 2A and 2B, in one embodiment, the rear telescope 500 includes a first variable power lens group 510 and a second variable power lens group 520 separated from one another by the second focal plane FP2. The first variable power lens group 510 may include a first objective lens group 512 and a second objective lens group 514. The second variable power lens group 520 may include a first eyepiece lens group 522 and a second eyepiece lens group 524. The first variable power lens group 510 is positioned on an object space side of the second focal plane and the second variable power lens group is positioned along the optical path on an eyepiece space side of the second focal plane. The shape and positioning of the objective lens groups 512, 514 and the eyepiece lens groups 522, 524 may be selected such that the rear telescope 500 provides a predetermined range of magnification for the optical sighting device 200.

According to one embodiment, the first objective lens group 512 of the rear telescope 500 is stationary, while the second objective lens group 514 is configured to move along the optical axis. Similarly, the second eyepiece lens group 524 may be stationary, while the first eyepiece lens group 522 may be configured to move along the optical axis. The moving lens groups 514 and 522 may be moved, for example, by using an arrangement of gears and cams in the housing of the optical sighting device 200, as discussed above. FIG. 2A shows the rear telescope 500 in a position that provides a minimum magnification level. FIG. 2B shows the rear telescope 500 in a position that provides a maximum magnification level. By moving the lens groups 514 and 522 between the position shown in FIG. 2A to the position shown in FIG. 2B, the rear telescope 500 provides continuous magnification within a particular magnification range. To transition between minimum magnification and maximum magnification, the second objective lens group 514 moves toward the first objective lens group 512 and the first eyepiece lens group 522 moves toward the second eyepiece lens group 524.

In one embodiment, the lens groups 514 and 522 may be moved to any intermediary position between the position of first variable power in FIG. 2A and the position of second variable power in FIG. 2B to provide the continuous range of magnification therebetween. According to one example, in the configuration shown in FIG. 2A the rear telescope 500 may be configured to provide 1× magnification. In the configuration shown in FIG. 2B, the rear telescope 500 may provide approximately 3.33× magnification. By moving the lens groups 514 and 522 from first to second position, continuous magnification between approximately 1× and approximately 3.33× may be achieved.

As the second objective lens group 514 and the first eyepiece lens group 522 are moved along the optical axis to provide varying magnification for the rear telescope 500, the second focal plane FP2 moves as well, and as a result, the rear telescope 500 remains afocal. In contrast, in the conventional optical sighting system discussed above with reference to FIG. 1, the second and third focal planes 55 and 75 do not move when the corresponding erector lens groups are zoomed. According to one embodiment of the optical sighting device 200, the second focal plane FP2 may have significant movement while still remaining within the rear telescope 500. This feature, in combination with the fact that the Galilean telescope used in the rotary tumbler 400 does not invert the image, may allow the optical sighting device 200 to be considerable shorter in length than a corresponding lens erector which must produce a real inverted image of the input focal plane. To correct for aberrations, in one example, approximately 4 inches of length are needed for the front telescope 300, approximately 1.5 of inch are needed for the Galilean tumbler 400, and about 4.5 inches for the rear telescope 500, resulting in a total length of approximately 10 inches. With the total 10 inches in length, the optical sighting device can achieve 30× magnification ratio (i.e. 30 to 1).

Figure 2C:
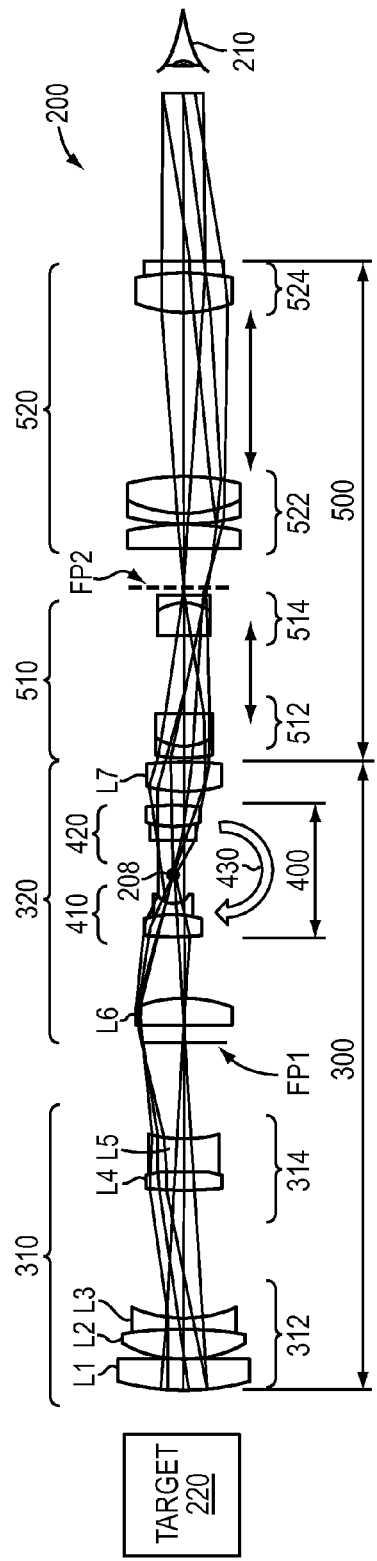
FIG. 2C is a diagram of another example of an optical sighting device including a rotary tumbler in disposed within the front telescope, according to aspects of the present invention.
Figure 2D:
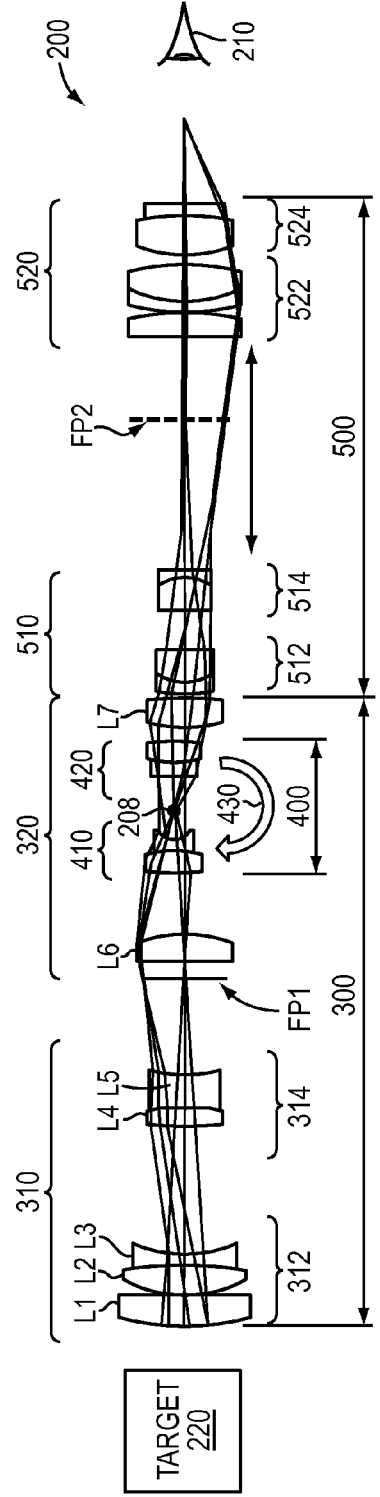
FIG. 2D is a diagram of another example of an optical sighting device including a rotary tumbler disposed within the front telescope, according to aspects of the present invention.

An alternative embodiment is shown in FIGS. 2C and 2D, where the rotary optical tumbler 400 is included in the front telescope 300. In this embodiment, the rotary optical tumbler 400 is disposed in the eyepiece 320 between the first eyepiece lens singlet L6 and the second eyepiece lens singlet L7. As shown in FIGS. 2C and 2D, light rays from the first eyepiece lens of the front telescope 300 are received by the negative lens group 410 and transmitted to the positive lens group 420. The light rays received by the positive lens group 420 are transmitted to the second eyepiece lens singlet L7. Light rays received by the second eyepiece lens singlet L7 are transmitted to the rear telescope 500. Similar to the embodiments described below, the rotary tumbler 400, in this embodiment, is rotatable between at least two positions, each position providing a particular magnification range. In one embodiment, the front telescope 300 changes magnification and inverts the image, and the rear telescope 500 changes the magnification of the image and inverts the image again, such that the final image is erect as a result of the two consecutive inversions.

According to various examples, the total magnification of the optical sighting device 200 is given by the product of the magnification of each of the three component groups (the front telescope 300, the rotary tumbler 400 and the rear telescope 500), which may be expressed as: m=mf×mt×mr, where mf is the magnification of the front telescope 300, mt is the magnification of the rotary tumbler 400 and the mr is the magnification of the rear telescope 500. According to one embodiment, if the magnification of the rotary tumbler 400, mt, is greater than 1, and the absolute value of the magnification of the rear telescope 500 varies from Mmin to Mmax, then the maximum magnification of the rear telescope 500 may be set to Mmax≥mt×Mmin. This configuration assures no gaps in magnification coverage as the rotary tumbler 400 is switched between the different magnification ranges. In addition, with this configuration, the total magnification ratio of the optical sighting device 200 may be at least $mt^3$, regardless of the base level of magnification (mf) provided by the front telescope 300. To set the minimum total magnification of the optical sighting device 200 to unity, the following condition applies: $m_t$=mf×Mmin.

As discussed above, the rotary tumbler 400 is switchable between different positions in which it may provide different levels or ranges of magnification. In one embodiment, the rotary tumbler 400 is switchable between three different positions, in which it provides three different, fixed levels of magnification. These different magnification levels provided by the rotary tumbler 400, together with the variable magnification provided by the rear telescope 500 may allow for a compact optical sighting device 200 that can provide a wide range of magnification, and which therefore may be used in a wide variety of circumstances and applications. For example, the optical sighting device 200 may be configured to provide total magnification, m, of approximately 1× to approximately 30×.

In one example, to achieve the above example magnification range of 1× to 30×, the following configuration may be used. The front telescope 300 may provide magnification (mf) of approximately 3.33×, and the rear telescope 500 may provide magnification (mr) of variable power between approximately 1× (Mmin) to approximately 3.33× (Mmax). The rotary tumbler 400 may provide magnification (mt) of approximately 1/3.33 in the first position, approximately 1× in the second position and approximately 3.33× in the third position.

Referring again to FIGS. 2A and 2B, which show the rotary tumbler 400 in the first position, in this example, the optical sighting device 200 may provide a magnification range of approximately 1× to 3.33×. The 1/3.33× magnification of the rotary tumbler 400 may balance out the 3.33× magnification of the front telescope 300, resulting the magnification range essentially being provided by the rear telescope, which in this example is 1× to 3.33×.

In another embodiment, instead of the rotary optical tumbler 400 the optical sighting device 200 may include two or more variable magnification groups. A first variable magnification group provides a first continuous magnification range and does not change image orientation. A second variable magnification group provides a second continuous magnification range and may change the orientation of the final image. The second variable magnification group may comprise a Gallilean zoom telescope. Together the first and the second variable magnification groups provide a continuous magnification range.

Referring to FIGS. 3A and 3B, the optical sighting device 200 is illustrated with the rotary tumbler 400 in a second position, with the lens groups 410 and 420 disposed perpendicular to the optical path. In other words, in FIGS. 3A and 3B, the rotary tumbler 400 has been rotated 90 degrees with respect to its position in FIGS. 2A and 2B. The light rays transmitted from the eyepiece lens L7 of the front telescope 300 are received by the objective lens group 512 of the rear telescope 500. Since the lens groups 410 and 420 are rotated out of the optical path, they do not influence the light rays, and the rotary tumbler 400 may be considered to have a magnification of unity (1×). As a result, the magnification range of the optical sighting system may be approximately 3.33× to approximately 10×, given by the product of the magnification of the front telescope (approximately 3.33×) and the rear telescope (approximately 1× to approximately 3.33×).

FIGS. 4A and 4B illustrate the rotary tumbler 400 switched into a third position by rotation about the axis 208. The third position of the rotary tumbler 400 is 90 degrees offset from its position in FIGS. 3A and 3B, and 180 degrees offset from its position in FIGS. 2A and 2B. In the example illustrated in FIGS. 4A and 4B the negative lens group 410 is in a position proximate to the rear telescope and the positive lens group 420 is in a position proximate to the front telescope. The light rays transmitted from the eyepiece lens L7 of the front telescope 300 are received by the negative lens group 420 of the optical tumbler 400 and reflected to the positive lens group 410. Continuing the above example, in the third position, the rotary tumbler provides approximately 3.33× magnification. Accordingly, the total magnification of the optical sighting device is approximately 10× to approximately 30× (resulting from the product mf×mt×mr).

As described above, the front telescope 300 provides a base magnification, the rotary tumbler provides variable magnification options while the rear telescope 500 provides continuous magnification of variable power within the variable magnification options. The magnifications described above are provided as one example of magnification possible using the arrangement of optical elements described above. And it is appreciated that various components or elements can be configured to provide different amount or ranges of magnification.

As described above, the combination of the front telescope 300, the variable power rear telescope 500, and the rotating tumbler 400 disposed between the front and rear telescopes, may provide a high range of magnification, making it potentially useful in a wide variety of applications and circumstances. In comparison with conventional sighting devices, the use of the rotary tumbler 400 may reduce the number of components needed to deliver the high range of magnification, and as the result may reduce the overall size and weight of the optical sighting device.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical sighting device comprising:
    a first telescope including a first focal plane;
    a second telescope, comprising a first variable power lens group, a second variable power lens group, and a second focal plane positioned between the first and second variable power lens groups; and
    a rotary optical tumbler comprised of a Galilean telescope configured to rotate into and out of an optical path that extends through the first telescope, the Galilean telescope and the second telescope, the rotation being about an axis disposed perpendicular to and intersecting the optical path.

2. The optical sighting device of claim 1, wherein the Galilean telescope is disposed between the first telescope and the second telescope.

3. The optical sighting device of claim 1, wherein both of the first telescope and the second telescope are Keplerian telescopes.

4. The optical sighting device of claim 1, wherein the first telescope includes a first positive objective group and a second positive objective: group, both positioned on an object space side of the first focal plane.

5. The optical sighting device of claim 4, wherein the first telescope further includes a first eyepiece lens singlet, and a second eyepiece lens singlet, positioned along the optical path on an eyepiece space side of the first focal plane.

6. The optical sighting device of claim 5, wherein the Galilean telescope is disposed between the first eyepiece lens singlet and the second eyepiece lens singlet.

7. The optical sighting device of claim 1, wherein the Galilean telescope further includes:
    a positive objective lens group; and
    a negative eyepiece lens group positioned opposing the positive objective lens group.

8. The optical sighting device of claim 1, wherein the first variable power lens group comprises an objective lens group positioned on an object space side of the second focal plane.

9. The optical sighting device of claim 8, wherein the second variable power lens group comprises an eyepiece lens group positioned along the optical path on an eyepiece space side of the second focal plane.

10. The optical sighting device of claim 9, wherein the objective lens group includes a stationary objective lens group and a movable objective lens group.

11. The optical sighting device of claim 9, wherein the eyepiece lens group includes a stationary eyepiece lens group and a movable eyepiece lens group.

12. The optical sighting device of claim 1, wherein the rotary optical tumbler is configured to rotate about the axis into and out of three positions, and configured to provide a different magnification in each position.

13. The optical sight device of claim 12, wherein a first position includes the negative eyepiece lens group of the rotary optical tumbler positioned proximate to the first telescope, and wherein the second telescope, in the first position, is configured to provide continuous magnification in a first magnification range.

14. The optical sighting device of claim 13, wherein the first magnification range includes approximately 1× magnification to approximately 3.33× magnification.

15. The optical sighting device of claim 12, wherein a second position includes the positive objective lens group and the negative eyepiece lens group rotated perpendicular to the optical path, and wherein the second telescope, in the second magnification position, is configured to provide continuous magnification in a second magnification range.

16. The optical sighting device of claim 15, wherein the second magnification range includes approximately 3.33× magnification to approximately 10× magnification.

17. The optical sighting device of claim 12, wherein a third position includes the positive objective lens group of the rotary optical tumbler positioned proximate to the first telescope, and wherein the optical sighting device, in the third magnification position, is configured to provide continuous magnification in a third magnification range.

18. The optical sighting device of claim 17, wherein the third magnification range includes approximately 10× magnification to approximately 30× magnification.

19. The optical sighting device of claim 1, wherein the optical sighting device is configured to provide continuous magnification in a range of approximately 1× magnification to approximately 30× magnification.

20. A method of providing magnification in an optical sighting device, the optical sighting device including a first telescope including a first focal plane, a second telescope comprising a first variable power lens group, a second variable power lens group, and a second focal plane positioned between the first and second variable power lens groups, and a rotary optical tumbler comprised of a Galilean telescope, disposed between the first telescope and the second telescope, configured to rotate into and out of a optical path that extends through the first telescope, the Galilean telescope and the second telescope, the rotation being about an axis disposed perpendicular to and intersecting the optical path, the method comprising:

rotating the rotary tumbler into and out of the optical path, around the axis; and through the rotating, switching the rotary tumbler between a plurality of positions including a first position in which the optical sighting device is configured to provide a first magnification range, a second position in which the optical sighting device is configured to provide a second magnification range, and a third position in which the optical sighting device is configured to provide a third magnification range.

\* \* \* \* \*